United States Patent
Wood

Patent Number: 5,178,482
Date of Patent: Jan. 12, 1993

[54] BALL JOINT

[75] Inventor: Ruey E. Wood, Harrison, Mich.

[73] Assignee: TRW Inc., Lyndhurst, Ohio

[21] Appl. No.: 823,852

[22] Filed: Jan. 22, 1992

[51] Int. Cl.⁵ .............................................. F16C 11/00
[52] U.S. Cl. .................................. 403/130; 403/133; 403/140
[58] Field of Search ............... 403/133, 137, 140, 130; 156/334

[56] References Cited

U.S. PATENT DOCUMENTS 3,408,124 10/1968 Melton et al. .
4,235,558 11/1980 Snyder et al. .................. 403/137 X
4,555,198 11/1985 Wenning et al. ............... 403/133 X
4,927,285 5/1990 Kotz et al. .
5,061,110 10/1991 Wood, Jr. .

FOREIGN PATENT DOCUMENTS 745983 11/1966 Canada ................................ 156/334
2223498 4/1990 United Kingdom ............... 156/334

*Primary Examiner*—Andrew V. Kundrat
*Attorney, Agent, or Firm*—Tarolli, Sundheim & Covell

[57] ABSTRACT

A ball joint 10 comprises a ball stud 14 having a ball portion 40 and a shank 42 extending from the ball portion 40. A thermoplastic plastic layer 16 encapsulates the ball portion 40 of the ball stud 14 and is adhered to the ball portion 40 of the ball stud 14. A synthetic elastomeric bushing 18 encapsulates the plastic layer 16 and the ball portion 40 of the ball stud 14. The bushing 18 is adhered to the plastic layer 16.

3 Claims, 1 Drawing Sheet

BALL JOINT

FIELD OF THE INVENTION

The present invention relates to a ball joint having an elastomeric bushing.

BACKGROUND OF THE INVENTION

U.S. Pat. No. 5,061,110 discloses a ball joint having an elastomeric bushing. The bushing supports a ball stud for limited pivotal movement in a socket. The bushing is formed of natural rubber (poly-isoprene) which is Banbury mixed and insert molded by injection and/or compression molding. The bushing is bonded to the ball portion of the ball stud in a two-step primer and adhesive bonding process. A primer is first applied to the ball portion of the ball stud by spraying or dipping. An adhesive is then applied over the primer. The primer and the adhesive are not allowed to dry before the rubber material of the bushing is molded over them, because the primer and the adhesive must be tacky in order to form a bond with the rubber material. The ball stud is therefore difficult to handle during the two-step bonding process. After the rubber material of the bushing is molded over the ball portion of the ball stud, it is cured to a desired solid state.

SUMMARY OF THE INVENTION

In accordance with the present invention, a ball joint comprises a ball stud, a thermoplastic plastic layer and a synthetic elastomeric bushing. The ball stud has a ball portion and a shank extending from the ball portion. The thermoplastic plastic layer encapsulates the ball portion of the ball stud and is adhered to the ball portion of the ball stud. The synthetic elastomeric bushing encapsulates the thermoplastic plastic layer and the ball portion of the ball stud, and is adhered to the thermoplastic plastic layer.

In a preferred embodiment of the invention, the thermoplastic plastic layer is formed of a polyolefin, preferably polypropylene. The synthetic elastomeric bushing is formed of a composition which comprises particles of an elastomeric material dispersed in a continuous matrix of a thermoplastic resin. The elastomeric particles in the bushing composition are included in an amount which is effective to impart elastomeric properties to the bushing composition. The elastomeric particles are preferably formed of polymerized ethylene-propylene diamine monomer (EPDM). The thermoplastic resin in the bushing composition is preferably a polyolefin, and is most preferably polypropylene.

When the ball stud is assembled, the thermoplastic plastic layer is formed around the ball portion of the ball stud at an elevated temperature. The heated thermoplastic material inherently adheres to the metallic surface of the ball portion of the ball stud. The synthetic elastomeric material of the bushing is injection molded over the thermoplastic plastic layer at an elevated temperature, and likewise adheres inherently to the thermoplastic material of the plastic layer.

Unlike prior art bushings which are formed of compositions including natural rubber, the bushing in accordance with the present invention is formed entirely of synthetic material. The synthetic material can be manufactured and molded to desired specifications with a consistency that is not attainable in the compounding and curing of natural rubber. Additionally, the ball joint is assembled without the use of a two-step, primer/adhesive bonding process. The thermoplastic material of the plastic layer adheres inherently to both the ball stud and the bushing. Moreover, the ball stud can be handled easily during the assembly process because the thermoplastic material of the plastic layer is allowed to return to its solid state before the bushing is formed around it.

BRIEF DESCRIPTION OF THE DRAWINGS

The foregoing and other features of the present invention will become apparent to one skilled in the art upon reading of the following description of the invention with reference to the accompanying drawings, wherein.

DESCRIPTION OF A PREFERRED EMBODIMENT

Figure 1:
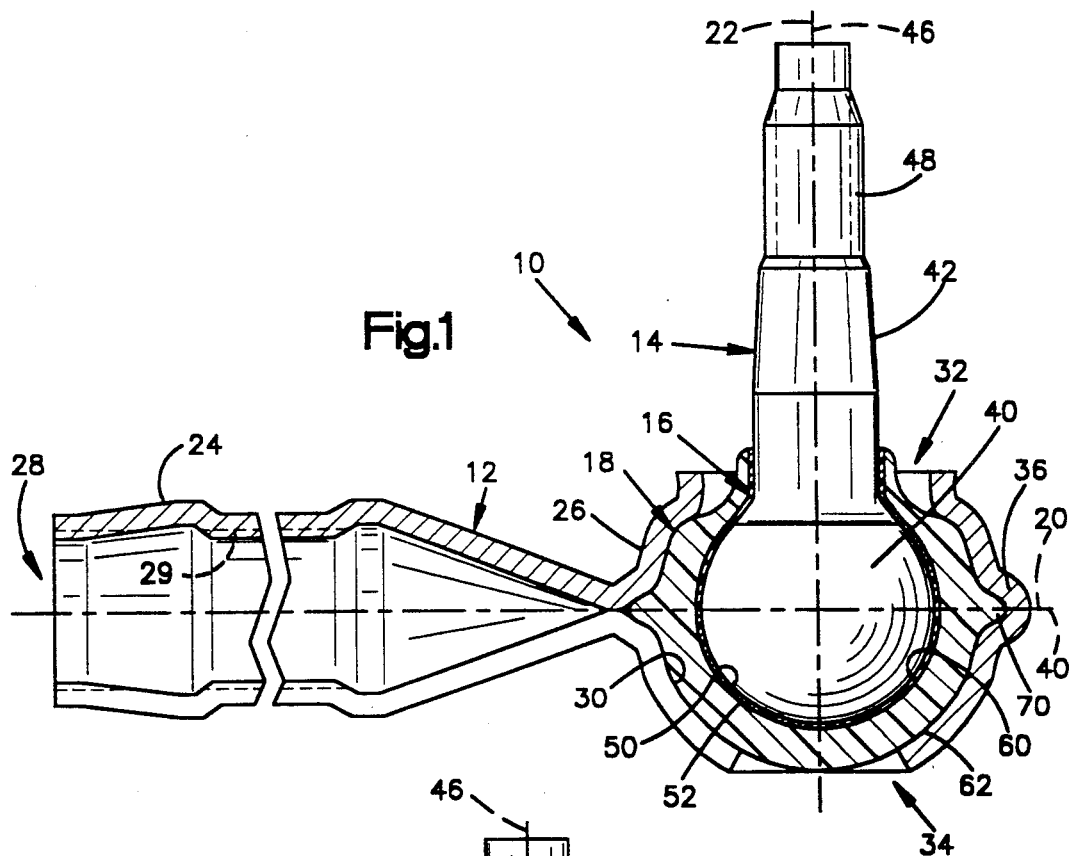
FIG. 1 is a view, partly in section, of a ball joint constructed in accordance with the present invention.

As shown in FIG. 1, a ball joint 10 constructed in accordance with the present invention comprises a socket 12 and a ball stud 14. The ball stud 14 is supported for limited pivotal movement in the socket 12 by a plastic layer 16 and a bushing 18. The plastic layer 16 is formed of a thermoplastic material. The bushing 18 is formed of a synthetic elastomeric material.

The socket 12 has a horizontal axis 20, a vertical axis 22, a first end portion 24 remote from the vertical axis 22, and a second end portion 26 centered on the vertical axis 22. The first end portion 24 of the socket 12 has an opening 28 and a threaded inner surface 29 for receiving the threaded end of a tie rod in a vehicle steering linkage. The second end portion 26 of the socket 12 has an inner surface 30 defining a substantially spherical chamber. The second end portion 26 of the socket 12 also has an upper opening 32, a lower opening 34, and an annular reinforcing portion 36. The upper and lower openings 32 and 34 are centered on the vertical axis 22. The annular reinforcing portion 36 has an arcuate profile centered on the horizontal axis 20, and extends circumferentially around the vertical axis 22.

The socket 12 is stamped from sheet metal using a progressive die, and is preferably formed of SAE grade 950 steel supplied by Worthington Steel Company with the trademark "MAXI-form 50". The socket 12 could alternatively be formed of any SAE/ASTM grade of stamping material suitable to meet the strength, ductility, and formability requirement of the stamping process and the final product application. The socket 12 is preferably formed into the shape shown in FIG. 1 using a progressive die in accordance with the invention set forth in U.S. Pat. No. 5,061,110.

The ball stud 14 has a ball end 40 and a shank 42 extending from the ball end 40. The ball end 40 has a horizontal axis 44 extending in a plane bisecting the ball end 40. The shank 42 has a longitudinal axis 46 perpendicular to the horizontal axis 44, and has a threaded surface portion 48 for connecting the ball stud 14 to a threaded component of a vehicle steering linkage.

The ball stud 14 is preferably formed of SAE 8115, 8615, 8640 or similar grade steel which is cold formed or machined, carburized or carbonitrided to a 20-30 Rc core hardness and a 0.006-0.015 inch case depth, and supplied by Republic Steel Corporation.

The plastic layer 16 has an inner surface 50 and an outer surface 52. The inner surface 50 is adhered to the ball end 40 and to an adjacent portion of the shank 42. The plastic layer 16 thus encapsulates the ball end 40. The plastic layer 16 is formed of a thermoplastic material, preferably a polyolefin. In the preferred embodiment of the invention shown in the drawings, the plastic layer 16 is formed of polypropylene. It is understood that the polypropylene can contain additives well known in the art, such as reinforcing agents, impact strength improvers, processing aids and stabilizers.

The bushing 18 has an inner surface 60 and an outer surface 62. The inner surface 60 of the bushing 18 is adhered to the outer surface 52 of the plastic layer 16. The bushing 18 thus encapsulates the plastic layer 16 and the ball end 40. The outer surface 62 of the bushing 18 is firmly pressed in frictional engagement with the inner surface 30 of the socket 12, and the bushing 18 is preloaded between the plastic layer 16 and the inner surface 30 of the socket 12. The bushing 18 thus supports the ball stud 14 in an assembled position relative to the socket 12, as shown in FIG. 1.

The bushing 18 enables movement of the ball stud 14 relative to the socket 12 under the influence of forces applied to the ball joint 10 in a vehicle steering linkage. The ball stud 14 can move slightly along the horizontal and vertical axes 20 and 22 of the socket 12, and can pivot about the horizontal and vertical axes 20 and 22 throughout a range of movement defined by the clearance between the shank 42 and the inner edge of the upper opening 32. When a force applied to the ball joint 10 moves the ball stud 14 from its assembled position relative to the socket 12, at least a portion of the bushing 18 is elastically deformed. The bushing 18 then exerts an elastic bias urging the ball stud 14 to return to its assembled position. When the applied force is removed, the elasticity of the bushing 18 moves the ball stud 14 back to its assembled position relative to the socket 12.

The bushing 18 is formed of an elastomeric composition which comprises particles of an elastomeric material dispersed in a continuous matrix of a thermoplastic resin. A preferred thermoplastic resin is a polyolefin. A preferred polyolefin is polypropylene. A preferred elastomeric material is a polymerized ethylene-propylene diamine monomer (EPDM). The elastomeric particles are included in the bushing composition in an amount which is effective to impart elastomeric properties to the bushing composition. The bushing composition can be processed by extrusion, injection molding, blow molding, thermoforming and calendaring on standard thermoplastic processing equipment.

In the preferred embodiment of the invention shown in the drawings, the bushing 18 is formed of a composition marketed by Monsanto under the trademark "SANTOPRENE." This composition comprises particles of EPDM dispersed in a polypropylene matrix. The physical and mechanical properties of the raw material of the "SANTOPRENE" composition used for the bushing 18, and the physical and mechanical properties of a molded test specimen of the "SANTOPRENE" composition used for the bushing 18, are defined by the performance requirements listed below, in accordance with TRW specification No. TMS-P-10,410.

| Performance Requirements | |
|---|---|
| A. Raw Material | |
| 1. Specific Gravity (ASTM D792) | 0.93 ± 0.02 |

| -continued | |
|---|---|
| Performance Requirements | |
| 2. Moisture Content. Max. (ASTM D789, 30 min. at 125° C.) | 0.1% |
| B. Molded Test Specimen | |
| 1. Hardness. Durometer "D" (ASTM D2240), 5 sec. delay | 50 ± 3 |
| 2. Tensile at Yield, min. (ASTM D638, Die IV, 2 in. (50 mm)/min.) | 10.3 MPa (1500 psi) |
| Elongation at Yield, min. | 30% |
| 3. Ultimate Tensile Strength, min. (ASTM D638, Die IV, 2 in. (50 mm)/min.) | 20 MPa (2900 psi) |
| 100% Modulus, min. | 9.0 MPa (1305 psi) |
| Ultimate Elongation, min. | 500% |
| 4. Compression Set, max. (ASTM D395, Method "B", 25% deflection) | |
| 22 hrs., 70° C. (158° F.), max. | 80% |
| 70 hrs., 125° C. (257° F.), max. | 95% |
| 5. Tear Strength, min. (ASTM D624, Die C) | 80 kN/M (445 psi) |
| 6. Immersion in ASTM Oil No. 3 (ASTM D471, 70 hrs at 125 ± 3° C.) | |
| Hardness, Durometer "D" Change, max. | −30 Points |
| Tensile Strength Change, max. | −50% |
| Elongation Change, max. | −55% |
| Volume Change, max. | +80% |
| 7. Heat Aged (ASTM D573, 168 hrs. at 150 ± 3° C.) | |
| Hardness, Durometer "D" Change, max. | ±11 Points |
| Tensile Change, max. | −35% |
| Elongation Change, max. | −50% |
| 100% Modulus, max. | +30% |
| 8. Temperature Brittleness, max. (ASTM D746) | |
| Method "B" Non-Brittle after 3 min. | −20° C. (−29° F.) |
| 9. Immersion in TMS-L-10,308 (Shell) and TMS-L-10,463 (Texaco) and TMS-L-10,318 (Exxon) Power Steering Fluid (ASTM D471, 70 Hrs., at 125 ± 3° C.) | |
| Hardness, Durometer "D" Change, max. | −25 max. |
| Tensile Strength Change, max. | −40% max. |
| Elongation Change, max. | −45% max. |
| Volume Change, max. | +35% max. |
| 10. Immersion in Brake Fluid (Dow HD 50-4) (ASTM D471, 70 hrs., at 125 ± 3° C.) | |
| Hardness, Durometer "D" Change | +10 max. |
| Tensile Strength Change, max. | +20% max. |
| Elongation Change, max. | −15% max. |
| Volume Change, max. | −25% max. |

The present invention further comprises a method of assembling the ball joint 10. The plastic layer 16 is first assembled onto the ball stud 14. The ball end 40 is cleaned, preferably with acid, before the plastic layer 16 is assembled onto the ball stud 14. The thermoplastic material of the plastic layer 16, which in the preferred embodiment is polypropylene, is formed around the ball end 40 and the adjacent portion of the shank 42 by injection molding. The injection molding process takes place at approximately 400° to 500° F. in order to fluidize the polypropylene material sufficiently for injection molding. Alternatively, the polypropylene or other thermoplastic material could be sprayed onto the ball end 40 in a liquid state, which would take place at a higher temperature, or the ball stud 14 could be tumbled in a beaded media of polypropylene or other thermoplastic material at a lower temperature. When the heated polypropylene material of the plastic layer 16 is applied to the ball stud 14 it adheres to the surface of the ball stud 14. It is thereafter returned to its natural state of hardness. Preferably, the plastic layer 16 has a thickness of 0.002–0.010 inches.

After the plastic layer 16 is assembled onto the ball stud 14, the ball stud 14 and the plastic layer 16 are placed in a mold. The ball stud 14 can be handled easily at this stage of the assembly process because the thermoplastic material of the plastic layer 16 has returned to its solid state. The plastic layer 16 is preheated to approximately 250°-300° F. to be tacky when the synthetic elastomeric material of the bushing 18 contacts it in the mold. The synthetic elastomeric material of the bushing 18 is then injection molded to encapsulate the ball end 40 and the plastic layer 16. The synthetic elastomeric material is injection molded at approximately 400° F. and adheres to the preheated plastic layer 16. The bushing 18 and the plastic layer 16 are distinct parts, but are adhered together at their adjoining surfaces 60 and 52 by the thermoplastic material, e.g., polypropylene, in the bushing 18 which becomes fused to the thermoplastic material, e.g., polypropylene, of the plastic layer 16.

Figure 2:
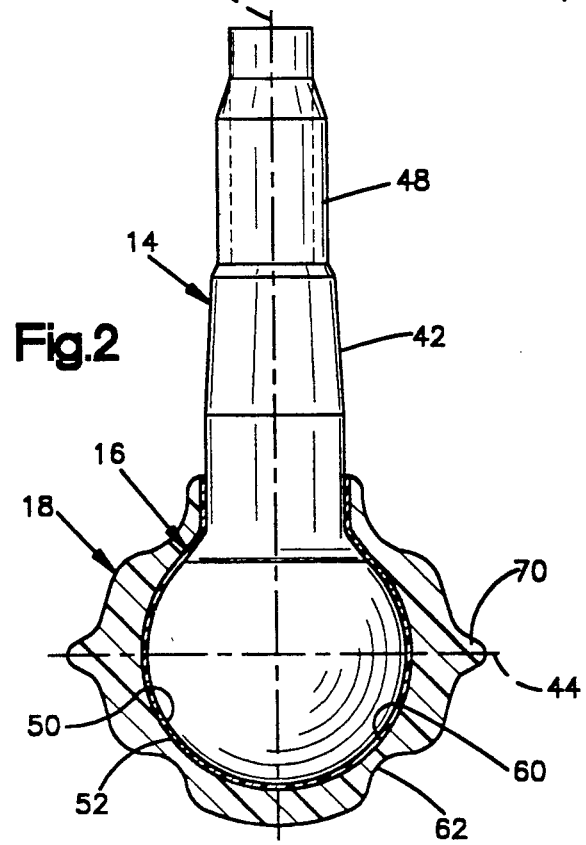
FIG. 2 is a view, partly in section, of parts of the ball joint of FIG. 1.

In the preferred embodiment of the invention, the bushing 18 is molded into the shape shown in FIG. 2. After the bushing 18 and the underlying plastic layer 16 and ball end 40 are assembled into the socket 12 as shown in FIG. 1, the bushing 18 has a substantially spherical shape conforming to the shape of the chamber defined by the inner surface 30 of the socket 12. The bushing 18 has a peripheral rib 70 which is shaped to fit into the recess defined by the reinforcing portion 36 of the socket 12. The bushing 18 is thus formed in accordance with the invention set forth in applicants, co-pending U.S. Pat. application Ser. No. 652,437, filed Feb. 8, 1991, and assigned to the present assignee.

From the above description of the invention, those skilled in the art will perceive improvements, changes and modifications. Such improvements, changes and modifications within the skill of the art ar intended to be covered by the appended claims.

Having thus described the invention, the following is claimed:

1. An apparatus comprising:
   a metallic ball stud having a ball portion and a shank extending from said ball portion;
   a plastic layer encapsulating said ball portion of said ball stud, said plastic layer adhering to said ball portion of said ball stud and being formed of a first composition consisting essentially of a thermoplastic material; and
   a synthetic elastomeric bushing encapsulating said plastic layer and said ball portion of said ball stud, said bushing being formed of a second composition comprising particles of an elastomeric material dispersed in a thermoplastic material, said particles of elastomeric material being included in said second composition in an amount which is effective to render said second composition substantially elastomeric, said bushing being bonded t said plastic layer by at least a portion of said thermoplastic material in said bushing which is fused with at least a portion of said thermoplastic material in said plastic layer.

2. An apparatus as defined in claim 1 wherein each of said thermoplastic materials is polypropylene.

3. An apparatus as defined in claim 2 wherein said particles of elastomeric material are formed of ethylene-propylene diamine monomer.

* * * * *

UNITED STATES PATENT AND TRADEMARK OFFICE
CERTIFICATE OF CORRECTION

PATENT NO. : 5,178,482

DATED : January 12, 1993

INVENTOR(S) : Ruey E. Wood

It is certified that error appears in the above-identified patent and that said Letters Patent is hereby corrected as shown below:

Column 6, Line 24, Claim 1, Change "t" to --to--.

Signed and Sealed this

Twenty-sixth Day of October, 1993

Attest:

BRUCE LEHMAN

Attesting Officer        Commissioner of Patents and Trademarks